(12) United States Patent
Banno (10) Patent No.: US 9,501,698 B2
(45) Date of Patent: Nov. 22, 2016

(54) MOVING OBJECT DETECTION METHOD

(71) Applicant: IHI Corporation, Koto-ku (JP)

(72) Inventor: Hajime Banno, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/638,274

(22) Filed: Mar. 4, 2015

(65) Prior Publication Data

US 2015/0206009 A1      Jul. 23, 2015

Related U.S. Application Data

(63) Continuation of application No. PCT/JP2013/073941, filed on Sep. 5, 2013.

(30) Foreign Application Priority Data

Sep. 7, 2012  (JP) ................... 2012-197531

(51) Int. Cl.
*G06K 9/00* (2006.01)
*B64G 1/68* (2006.01)
(Continued)

(52) U.S. Cl.
CPC ............ *G06K 9/00624* (2013.01); *B64G 1/68* (2013.01); *B64G 3/00* (2013.01); *G06T 5/002* (2013.01); *G06T 5/10* (2013.01); *H04N 5/2176* (2013.01); *H04N 5/361* (2013.01); *H04N 5/3651* (2013.01);
(Continued)

(58) Field of Classification Search
None
See application file for complete search history.

(56) References Cited

U.S. PATENT DOCUMENTS

2003/0202682 A1    10/2003  Yanagisawa et al.
2006/0103742 A1*    5/2006  Kubo ................... H04N 5/2178
                                                        348/241
2012/0154579 A1     6/2012  Hampapur et al.

FOREIGN PATENT DOCUMENTS

JP          2000-025700 A      1/2000
JP          2002-139319 A      5/2002
(Continued)

OTHER PUBLICATIONS

Yanagisawa, T., et al., "Automatic Detection Algorithm for Small Moving Objects," *Astronomical Society of Japan*, Apr. 25, 2005, pp. 399-408.

(Continued)

*Primary Examiner* — Stephen R Koziol
*Assistant Examiner* — Amandeep Saini
(74) *Attorney, Agent, or Firm* — Oblon, McClelland, Maier & Neustadt, L.L.P.

(57) ABSTRACT

When correction values are respectively determined for noise components of "OFFSET COMPONENT OF CCD ELEMENT", "GRADATION COMPONENT OF BACKGROUND LIGHT" and "OFFSET COMPONENT OF OPTICAL SYSTEM", the pixel values including as less of these noise components as possible are evaluated. The evaluated pixel values include a noise component of "THERMAL NOISE PLUS READOUT NOISE COMPONENT" which is superposed onto the pixel values. With this taken into consideration, a moving object detection method of an embodiment photographs multiple images of a moving object being an observation object with a photographic area fixed, selects the smallest pixel value in each group of corresponding pixels across the images from image signals representing the images, evaluates image signals including as less of the four noise components as possible by using the smallest pixel value as the correction value for the four noise components.

16 Claims, 3 Drawing Sheets

(51) Int. Cl.
    *B64G 3/00*     (2006.01)
    *H04N 5/217*     (2011.01)
    *H04N 5/361*     (2011.01)
    *G06T 5/00*     (2006.01)
    *G06T 5/10*     (2006.01)
    *H04N 5/365*     (2011.01)
    *H04N 5/14*     (2006.01)

(52) U.S. Cl.
    CPC ............... *G06T 2207/10016* (2013.01); *G06T 2207/20182* (2013.01); *H04N 5/144* (2013.01)

(56) References Cited

FOREIGN PATENT DOCUMENTS

| JP | 2002-220098 A | 8/2002 |
|---|---|---|
| JP | 2002-220099 A | 8/2002 |
| JP | 2002-310616 A | 10/2002 |
| JP | 2003-323625 A | 11/2003 |
| JP | 2012-56517 A | 3/2012 |
| RU | 2446471 C1 | 3/2012 |
| WO | WO 2012/033159 A1 | 3/2012 |

OTHER PUBLICATIONS

Paolillo, F., et al., "First Italian Space Debris Observatory: Images Processing Automation," *International Astronautical Congress*, 2007. Retrieved Feb. 24, 2015.

International Search Report issued Oct. 8, 2013 for PCT/JP2013/073941 filed on Sep. 5, 2013 with English Translation.

Office Action issued on May 26, 2016 in Russian Patent Application No. 2015111739/07(018306).

Office Action issued on Jul. 5, 2016 in Japanese Patent Application No. 2012-197531.

Toshifumi Yanagisawa, et al., "Detection of Small GEO Debris by Use of the Stacking Method", The Japan Society for Aeronautical and Space Sciences, vol. 51, No. 589, 2003, pp. 61-70 (with English Abstract).

* cited by examiner

MOVING OBJECT DETECTION METHOD

CROSS REFERENCE TO RELATED APPLICATION

The present application is a continuation application of International Application No. PCT/JP2013/073941, filed Sep. 5, 2013, which claims priority to Japanese Patent Application No. 2012-197531, filed Sep. 7, 2012. The contents of these applications are incorporated herein by reference in their entirety.

BACKGROUND OF THE INVENTION

1. Field of the Invention

The present invention relates to a method of detecting a moving object from captured images.

2. Description of the Related Art

Space debris is an out-of-service artificial object which orbits the Earth. A detection of the existence of the space debris is important for smooth operation of spacecraft (artificial satellites, space stations, space shuttles and the like). One method among conventional space debris detection methods determines the existence of space debris by extracting high-luminance parts respectively from images captured by a CCD (charge coupled device) camera on the Earth or on the orbit.

This method includes: cropping areas in the same size from three or more images captured at time intervals in accordance with the movement of a moving object such as space debris; and applying a stacking method to the cropped image areas. Here, the movement of the moving object is the uniform motion or the like having mobile vectors (velocities) in a two-dimensional direction in the xy-coordinate system, for example. To put it concretely, the cropped image areas are superposed on one another, and a median value is evaluated from pixel values at the same pixels across the superposed image areas. If the median value thus evaluated is equal to or greater than a predetermined value, the pixel is extracted as a pixel representing the existence of the moving object (see Japanese Patent Application Laid-open Publications Nos. 2002-139319 and 2003-323625, for example).

The stacking method is a widely-used effective method not only for detecting space debris, but also for detecting a moving object at a low luminance level in an image. Furthermore, as described above, the stacking method employs the median pixel value as the evaluation value for the moving object detection. Therefore, the stacking method causes no rise in the evaluation value even if a noise component happens to be captured in some of the images (for example, a star or a cosmic ray in the cosmic space is captured in some of the images), in contrast to another case in which an average pixel value is used as the evaluation value. For this reason, the stacking method is advantageous in inhibiting erroneous detection of a moving object due to the existence of a star or a cosmic ray which happens to be captured therein.

Dark correction on an offset component unique to the CCD element, and flat correction on limb-darkening attributed to the characteristics of an optical system (a lens and a Newtonian reflector) of an astronomical telescope which is used in combination with the CCD camera are considered as being effective to enhance the detection accuracy as well (see Yanagisawa, T. and Nakajima, A. [2005]. "Automatic Detection Algorism for Small Moving Object." Publications of the Astronomical Society of Japan, vol. 57, pp. 399-408, for example).

Furthermore, correction on a gradational change in brightness of the background light, which occurs due to clouds in the sky, scattering of light in the atmosphere, or existence of an area with a locally high luminance is also considered as being effective to enhance the detection accuracy (see Paolillo, F. and Porfilio, M. "First Italian Space Debris Observatory: Images Processing Automation." Proceedings of International Astronautical Congress 2007, IAC-07-A6.I.05, for example).

SUMMARY OF THE INVENTION

When the above-described various noise components are corrected, contents of the noise components are evaluated by using image signals obtained by photographing the images with the CCD camera under appropriate conditions, and correction contents are determined based on the noise component contents.

However, noise components occurring when the captured images are quantized into the image signals, such as thermal noise of photodetectors and readout noise of the CCD elements which occur in the CCD camera, are included not only in the image signals before being subjected to the dark correction, the flat correction and the like, but also in image signals used to determine the correction values.

For this reason, when the image signals before the correction are corrected using the correction values, the noise components occurring in association with the quantization of the captured images are added to the image signals after being subjected to the dark correction, the flat correction and the like, and accordingly decrease the accuracy with which to detect the moving object.

The present invention has been made with the foregoing situations taken into consideration. An object of the present invention is to provide a moving object detection method of detecting a detection object in images based on signal levels, the method capable of reducing noise components existing in the background area behind the detection object in each image.

An aspect of the present invention provides a method (a moving object detection method) of detecting a moving object being an observation object using a plurality of images captured in equal intervals, including: detecting the moving object being the observation object by using the plurality of offset-corrected images obtained by performing offset correction on pixel values of pixels across all the images using the smallest pixel value among the pixels across all the images.

The offset correction may be performed on the pixel values by use of the smallest pixel value among the pixel values of the pixels across multiple images captured with a photographic area fixed.

The offset-corrected images may be sequentially moved in accordance with contents corresponding to estimated movement contents of the moving object being the observation object in the equal intervals, and the moving object being the observation object is detected from the plurality of offset-corrected images based on the pixel values at the same pixel positions overlapping one another across the offset-corrected images.

The method may include performing a filtering process on each pixel in one image of the plurality of offset-corrected images and calculating a pixel value of the pixel, the filtering process configured to move the one image and a different offset-corrected image, which is photographed one interval before or after the one image in the equal intervals in accordance with contents corresponding to already-known movement contents in the equal intervals of a moving object different from the observation object, and to subtract pixel values at the pixels in the different image from the pixel values at the pixels in the one image, the pixels in the different image overlapping and being located at the same pixel positions as the corresponding pixels in the one image. The method may include using the calculated pixel values after the filtering process as the pixel values in the one offset-corrected image.

The moving object being the observation object may be an object orbiting the earth. The images may be images which are photographed at intervals during fixed-point observation.

When a detection object in images is detected based on signal levels, the present invention can reduce noise components existing in the background area behind the detection object in each image.

DESCRIPTION OF THE PREFERRED EMBODIMENTS

Referring to the drawings, descriptions will be provided for an embodiment in which a moving object detection method of the present invention is applied to detection of space debris from photographed celestial images.

The moving object detection method of the embodiment is designed to detect space debris as a moving object being an observation object from the photographed celestial images. A described in a flowchart of FIG. 1, this method is designed to perform a photographing (capturing) and image reading process step (step S1), a preliminary process step (step S3) and a superposition process step (step S5).

Figure 1:
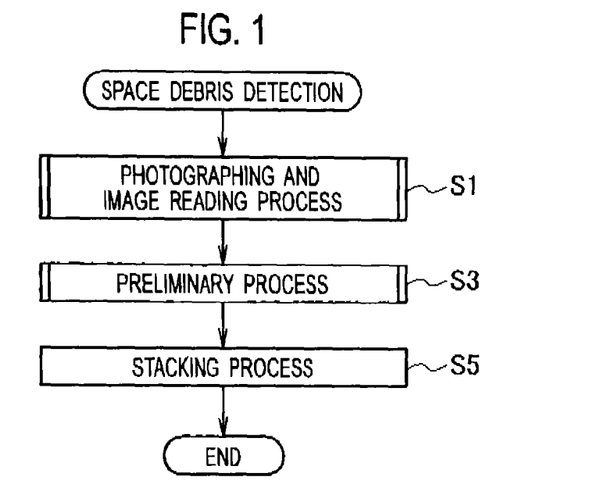
FIG. 1 is a flowchart showing procedures when a moving object detection method of the present invention is applied to detection of space debris from images in which the sky is captured.
Figure 2:
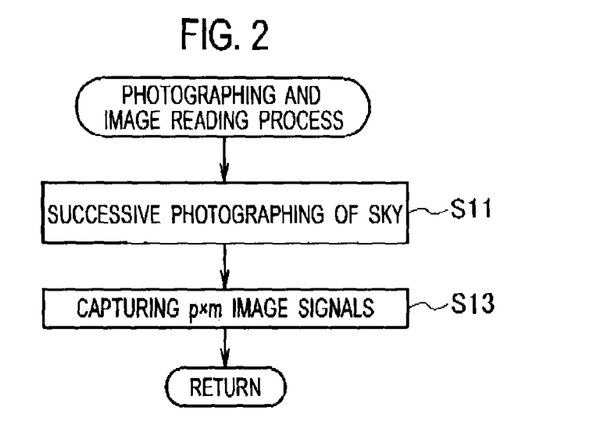
FIG. 2 is a flowchart showing a concrete procedure of a photographing (capturing) and image reading process step shown in the flowchart of FIG. 1.

As shown in the flowchart of FIG. 2, the photographing and image reading process step (step S1 in FIG. 1) begins with repeatedly making a series of photographs of a space (the sky), including the geostationary orbit of space debris, for a predetermined length of exposure time at constant time intervals (step S11). Subsequently, the image reading process step (step S1 of FIG. 1) ends with capturing image signals representing the captured images (step S13).

A photographing (capturing) apparatus (not illustrated) formed by connecting a CCD camera to an astronomical telescope, for example, may be used for taking the images of the sky.

Figure 3:
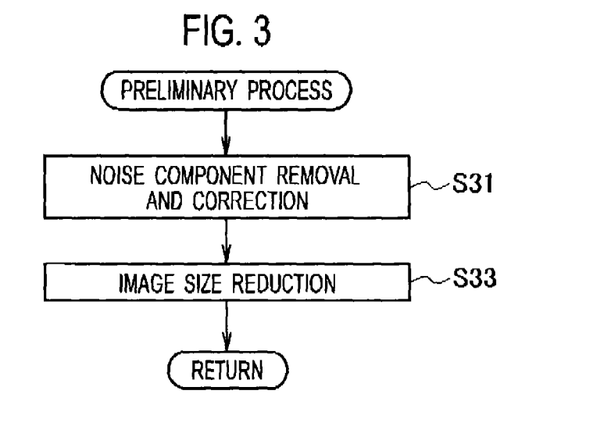
FIG. 3 is a flowchart showing a concrete procedure of a preliminary process step shown in the flowchart of FIG. 1.

Thereafter, as shown in the flowchart of FIG. 3, the preliminary process step (step S3 in FIG. 1) begins with making corrections to the image signals, captured from the photographing apparatus (not illustrated), by removing noise components included in the image signals (step S31). Afterward, the size of images representing the corrected image signals is reduced to an image size to be handled in the below-described superposition process step (step S5 in FIG. 5) (step S33). In the embodiment, the size of the images is reduced to a half in both the vertical and horizontal directions (to a quarter in terms of the area). Then, the largest pixel value in the 2×2 pixels before the reduction is assigned as a pixel value to one pixel after the reduction. Hence, the preliminary process step (step S3 in FIG. 1) is terminated.

Figure 4:
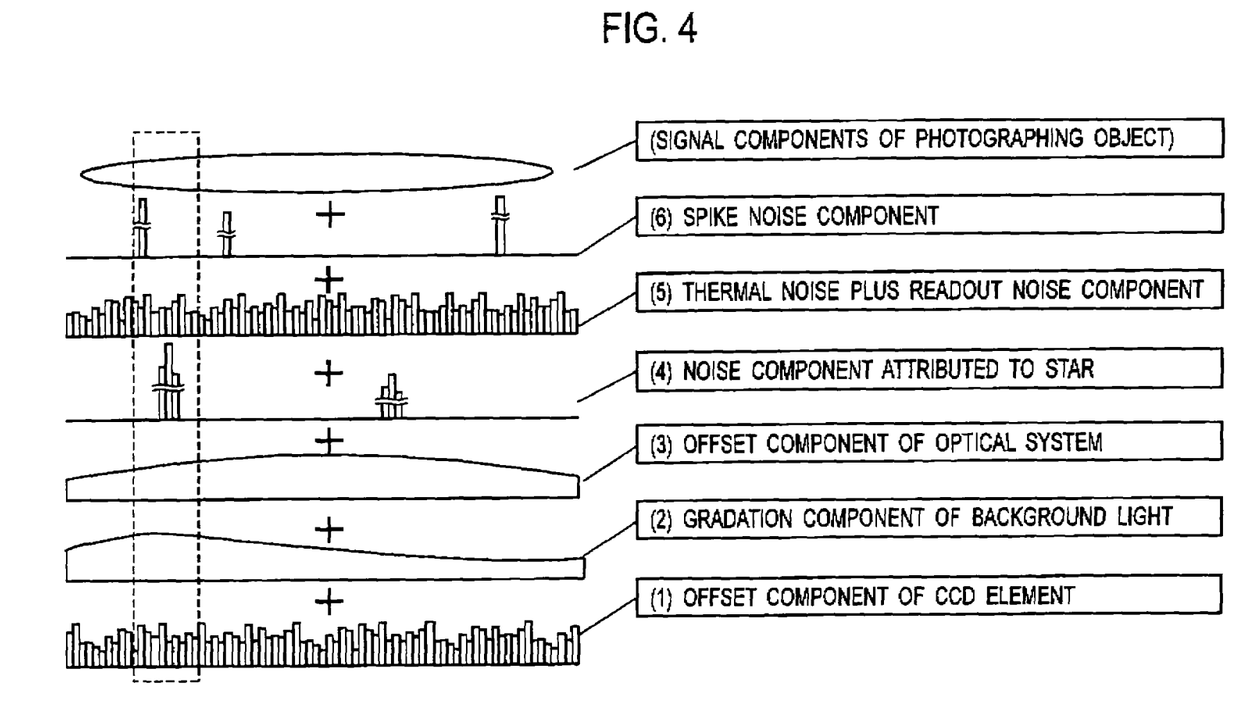
FIG. 4 is an explanatory diagram schematically showing how noise components to be removed in a noise component removing and correcting step in FIG. 3 are distributed on the same line in a lateral direction of a picture plane.

Descriptions will be provided for a detailed procedure for making correction by removing noise components in step S31. As schematically shown in FIG. 4, mainly 6 types of noise components are superposed onto a signal component which represents an intended photographic object, after images are photographed with the photographing apparatus (not illustrated) and before the image signals are captured. It should be noted that FIG. 4 schematically shows the noise components existing on the same line in a lateral direction of a picture plane in an image signal.

To begin with, the noise component of a first type is "(1) OFFSET COMPONENT OF CCD ELEMENT" shown at the bottom row in FIG. 4. The offset component of the CCD element is a noise component which occurs when an image of an object photographed by the photographing apparatus (not illustrated) using the astronomical telescope is converted into an electrical signal by the CCD element of the CCD camera. In other words, when an output has to correspond to a zero luminance (i.e., when the quantity of light from the object is at zero), the CCD element may, in some cases, shift (offset) an actual output from the point 0 (zero). Furthermore, the contents of the shift (offset) vary from one CCD element to another.

As a measure to counter this, when an object at a zero luminance is photographed, the offset component of the CCD element is corrected (i.e., subjected to offset correction) in order that the image signal outputted from the photographing apparatus becomes "0." Incidentally, the offset correction of this case is termed as dark correction. The correction value can be obtained by evaluating a value of the output from the CCD element at the time of photographing while blocking the light receiving unit from light.

Subsequently, the correction value thus evaluated is subtracted from the pixel value at each of the pixels which corresponds to an image of the sky photographed by the photographing apparatus for the moving object detection. This makes it possible to correct the offset component of the CCD element.

The noise component of a second type is "(2) GRADATION COMPONENT OF BACKGROUND LIGHT" shown at the second row from the bottom in FIG. 4. The gradation component of the background light occurs when light is scattered by clouds or the atmosphere, or when a high-luminance area exists locally. To put it concretely, the gradation component occurs when the brightness of the sky to be photographed by the photographing apparatus (not illustrated) is not uniform, and the brightness of the sky as the background gradationally varies with an angle of elevation from the observation point or with the distance from the high-luminance point, for example.

For this reason, the correction on the gradation component of the sky can be achieved by subtracting the evaluated correction value from the pixel values at the pixels which represent the sky photographed with the photographing apparatus for the purpose of the moving object detection.

To this end, the correction on the gradation component of the background light is made in a way that, when photographing the image of the object with a uniform luminance, the image signals outputted from the photographing apparatus become uniform across the entire image of the object. It is desirable that the correction value in this case be evaluated based on approximation of the gradational changes with linear function expressions by use of the image signals obtained by performing the correction on the above-described "(1) OFFSET COMPONENT OF CCD ELEMENT" when photographing the image of the object with the uniform luminance, or by use of image signals obtained by further performing correction on "(3) OFFSET COMPONENT OF OPTICAL SYSTEM" to be described later in addition to the correction on "(1) OFFSET COMPONENT OF CCD ELEMENT."

A method of obtaining the gradation as inclinations to the x- and y-axes is shown in "First Italian Space Debris Observatory: Images Processing Automation" authored by Paolillo, F. and Porfilio, M. in IAC-07-A6.I.05 for International Astronautical Congress 2007, which has been listed in Citation List (NPL 2) in the section "Background Art." According to the method shown in the document, for each row in an image from which a median value is evaluated, data in a 1×x matrix is generated, and a linear expression (v=ax+c) to approximate the gradation in the x-axis direction is determined using the least square method. Similarly, for each column in the image from which a median value is evaluated, data in a y×1 matrix is generated, and a linear expression (v=by+c) to approximate the gradation in the y-axis direction is determined using the least square method.

Thereafter, the evaluated correction value is subtracted from the pixel values at the pixels which represent the sky to be photographed with the photographing apparatus for the purpose of the moving object detection. Thereby, the above-described correction on the gradation component of the sky can be achieved.

The noise component of a third type is "(3) OFFSET COMPONENT OF OPTICAL SYSTEM" shown at the third row from the bottom in FIG. 4. The offset component of the optical system is caused by characteristics of the optical system such as a Newtonian reflecting mirror or lenses in the astronomical telescope, when an image of the object is photographed by the photographing apparatus (not illustrated) using the astronomical telescope. To put it concretely, the brightness of the peripheral portion of the image into which the object is captured by the optical system is reduced (limb darkening). The limb darkening occurs in a larger scale as the entire image of the object is brighter.

For this reason, correction is made on the offset component of the optical system in a way that, when photographing the image of the object with the uniform luminance, the image signals outputted from the photographing apparatus become uniform across the entire image of the object. The offset correction in this case is termed as flat correction. It is desirable that the correction value be evaluated based on acquisition of limb darkening distribution by use of the image signals obtained by performing the correction on the above-described "(1) OFFSET COMPONENT OF CCD ELEMENT" when photographing the image of the object with the uniform luminance.

Incidentally, the image of the object with the uniform luminance can be obtained, for example, by: setting a piece of frosted glass or the like in front of the telescope; photographing the object using the entire field of vision of the telescope with uniform light cast onto the piece of frosted glass.

Thereafter, the evaluated correction value is subtracted from the pixel values at the pixels which represent the sky to be photographed with the photographing apparatus for the purpose of the moving object detection. Thereby, the above-described correction on the offset component of the optical system can be achieved.

With regard to each of the three types of noise components described above, the correction process has been conventionally achieved by means of: extracting the noise component; and subtracting the noise component from the image signals. However, the conventional correction processes adds other noise components contained in the extracted noise components, and the other noise components remain in the corrected image signals. For this reason, the embodiment seeks to solve the problem by use of the following methods.

Before descriptions are provided for how the embodiment solves the problem, let us explain the other noise components which are added onto and remain in the corrected image signals as a result of the conventional correction processes (i.e., noise components of fourth to sixth types to be described as follows).

Let us begin the explanation with the noise component of the fourth type. The noise component "(4) NOISE COMPONENT ATTRIBUTED TO STAR" shown at the fourth row from the bottom in FIG. 4 occurs when a star in the sky is captured into images captured with the photographing apparatus (not illustrated) in a way that, depending on its moving velocity, the star is captured as a point or line with blurred surroundings.

The noise component attributed to the star can be eliminated from each of the images by moving each image and its preceding or following image captured in succession by the photographing apparatus (not illustrated) by parallel displacement in an already-known movement direction and by an already-known amount of movement of the star, and subtracting the pixel values at the same pixel positions overlapping each other across the two images (a filtering process).

Next, the noise component of a fifth type is "(5) THERMAL NOISE PLUS READOUT NOISE COMPONENT" shown at the third row from the top in FIG. 4. The thermal noise and the readout noise component occur due to: the photographing of an image of the object with the photographing apparatus (not illustrated); and the outputting of image signals which represent the image.

Among them, the thermal noise is a noise component which stays in the CCD element due to thermal vibration of electrons inside a photodetector when the photodetector generates electric charges depending on the quantity of light of the formed image of the object. On the other hand, the readout noise is a noise component which occurs when the electric charges into which the CCD element converts the image of the object are read out from the CCD element. The readout noise includes all the noises which occur inside the CCD element, inside analog circuits used to control the CCD element and read out the electric charges, as well as inside an analog-to-digital converter.

The above-described "(5) THERMAL NOISE PLUS READOUT NOISE COMPONENT" is a random noise which does not depend on where or when the noise occurs, and which varies in a random manner. It is generally known that the thermal noise which is a shot noise exhibits Poisson distribution while the readout noise exhibits Gaussian distribution.

Next, the noise component of a sixth type is "(6) SPIKE NOISE COMPONENT" shown at the second row from the top in FIG. 4. The spike noise component is a noise component which occurs under the influence of cosmic rays. In some cases, the spike noise component makes some pixels show an instantaneous large increase in pixel value at irregular points of time.

Figure 5A:
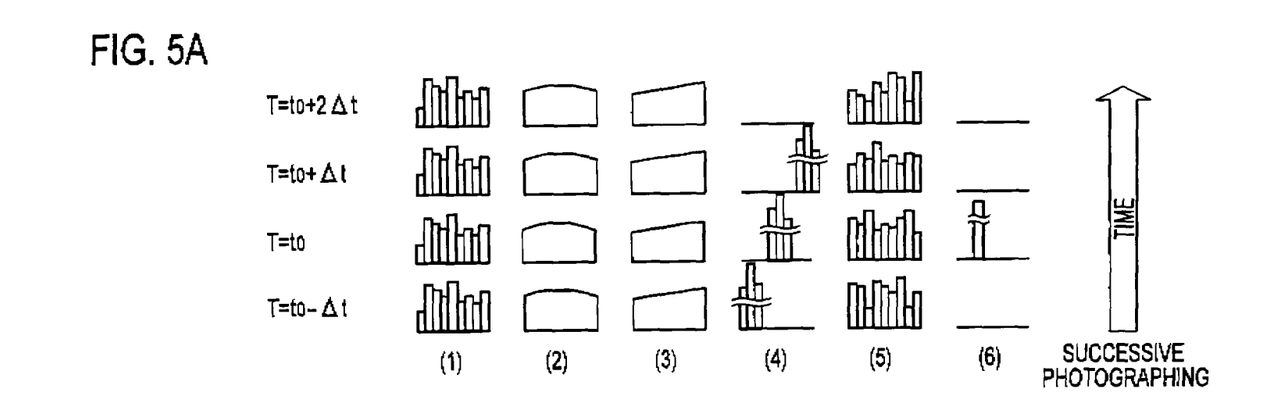
FIG. 5A is an explanatory diagram showing noise components, which appear in a pixel area surrounded with a dashed-line frame in FIG. 4, in accordance with points of timing at which the respective images are photographed

Here, for each of four images captured with the photographing apparatus (not illustrated) at the respective four successive points of timing (T=t0−Δt, t0, t0+Δt, and t0+2Δt), noise component contents included in an image signal are discretely shown in the schematic diagram of FIG. 5A. Particularly, FIG. 5A shows waveforms extracted from a part of one line in a lateral direction of the picture plane, which is surrounded with dashed lines in FIG. 4. Similarly, the schematic diagrams of FIGS. 5B and 5C, which will be used for the following explanation, each show waveforms extracted from a part of the line.

As shown in FIG. 5A, the noise components of "(1) OFFSET COMPONENT OF CCD ELEMENT," "(2) GRADATION COMPONENT OF BACKGROUND LIGHT" and "(3) OFFSET COMPONENT OF OPTICAL SYSTEM" depend on the photographing apparatus and a photographed area of the sky. For this reason, as long as the same photographing apparatus continued to be used and the same area of the sky continued to be photographed, the above-mentioned noise components appear in every image as constant contents no matter what point of timings the image is photographed at. In addition, the contents of "(4) NOISE COMPONENT ATTRIBUTED TO STAR" depend on the luminance of the star, although positions of pixels into which the star is captured change in accordance with the movement of the star. For this reason, as long as the same star continued to be captured into the images, this noise component also appears in every image.

In contrast, the noise components of "(5) THERMAL NOISE PLUS READOUT NOISE COMPONENT" and "(6) SPIKE NOISE COMPONENT" are random noises. For this reason, their contents vary depending on the images. This makes it impossible to determine appropriate correction contents in advance.

What have been discussed above covers the noise component contents included in the signals which represent the images captured by the photographing apparatus (not illustrated). When correction values are determined, respectively, for the noise components of "(1) OFFSET COMPONENT OF CCD ELEMENT," "(2) GRADATION COMPONENT OF BACKGROUND LIGHT" and "(3) OFFSET COMPONENT OF OPTICAL SYSTEM" using the conventional correction method, the pixel values excluding as much of these noise components as possible are evaluated from the image signals from the photographing apparatus based on calculations and the like.

Meanwhile, depending on photographing situations, "(4) NOISE COMPONENT ATTRIBUTED TO STAR," "(5) THERMAL NOISE PLUS READOUT NOISE COMPONENT" which is the random noise, and "(6) SPIKE NOISE COMPONENT" without specific regularity are superposed onto the image signals from the photographing apparatus which are used to determine the correction values.

For this reason, even if the noise component of "(4) NOISE COMPONENT ATTRIBUTED TO STAR" is eliminated based on the foregoing procedure, the noise components of "(5) THERMAL NOISE PLUS READOUT NOISE COMPONENT" and "(6) SPIKE NOISE COMPONENT" still remain included, as described above, in the correction values which are determined, respectively for the noise components of "(1) OFFSET COMPONENT OF CCD ELEMENT," "(2) GRADATION COMPONENT OF BACKGROUND LIGHT" and "(3) OFFSET COMPONENT OF OPTICAL SYSTEM."

Accordingly, when the noise components of "(1) OFFSET COMPONENT OF CCD ELEMENT," "(2) GRADATION COMPONENT OF BACKGROUND LIGHT" and "(3) OFFSET COMPONENT OF OPTICAL SYSTEM" included in the pixel values are corrected respectively by use of the correction values for the noise components, the noise components of "(5) THERMAL NOISE PLUS READOUT NOISE COMPONENT" and "(6) SPIKE NOISE COMPONENT" are added to and included in the corrected pixel values.

With this taken into consideration, the embodiment seeks to solve the problem by making correction by removing noise components, as described later, in step S31 in FIG. 3 of making the correction by removing the noise components. To this end, first of all, multiple images are photographed by the photographed apparatus with the field of vision fixed, and the smallest pixel value is selected from each group of corresponding pixels across the multiple images.

In this respect, in a case where a star is captured into the images, or in a case where a spike noise occurs, a sufficiently large value as the noise component is added to the pixel values. As a result, the pixel values at the pixels into which the star is captured, or to which the spike noise is added, will not become the smallest in the multiple images. For this reason, the smallest pixel value in each group of corresponding pixels across the multiple images is selected as a pixel value of a pixel into which at least no star is captured, and to which no spike noise attributed to cosmic rays is added. Instead, the smallest pixel values may be selected from multiple images into which no cosmic rays as a spike noise are captured, after the noise component of "(4) NOISE COMPONENT ATTRIBUTED TO STAR" is eliminated from the multiple images using the foregoing procedure.

Here, first three noise components out of "(1) OFFSET COMPONENT OF CCD ELEMENT," "(2) GRADATION COMPONENT OF BACKGROUND LIGHT," "(3) OFFSET COMPONENT OF OPTICAL SYSTEM" and "(5) THERMAL NOISE PLUS READOUT NOISE COMPONENT" included in the pixel values in the images, into which no stars or cosmic rays as a spike noise are captured, are constant components and are therefore included in all the pixels in every image in the same volumes. This means that each smallest pixel value includes neither "(4) NOISE COMPONENT ATTRIBUTED TO STAR" nor "(6) SPIKE NOISE COMPONENT," and that each smallest pixel value includes "(5) THERMAL NOISE PLUS READOUT NOISE COMPONENT," whose contents vary depending on the images, in a smaller volume than the corresponding pixels in the other images.

In addition, the smallest value of "(5) THERMAL NOISE PLUS READOUT NOISE COMPONENT" is at "0." For this reason, it is possible to consider that the smallest pixel value in each group of corresponding pixels across the multiple images into which no stars or cosmic rays as a spike noise are captured are equivalent to an amount of correction to be made by performing compensation on "(1) OFFSET COMPONENT OF CCD ELEMENT," "(2) GRADATION COMPONENT OF BACKGROUND LIGHT" and "(3) OFFSET COMPONENT OF OPTICAL SYSTEM" in a lump.

Accordingly, as the amount of correction, the smallest pixel value selected from each group of corresponding pixels across the multiple images into which no stars or cosmic rays as a spike noise are captured is subtracted from the pixel values in the images representing the sky area photographed with the photographing apparatus for the moving object detection. Thereby, the correction is made in a lump on the noise components of "(1) OFFSET COMPONENT OF CCD ELEMENT," "(2) GRADATION COMPONENT OF BACKGROUND LIGHT" and "(3) OFFSET COMPONENT OF" OPTICAL SYSTEM."

Figure 5B:
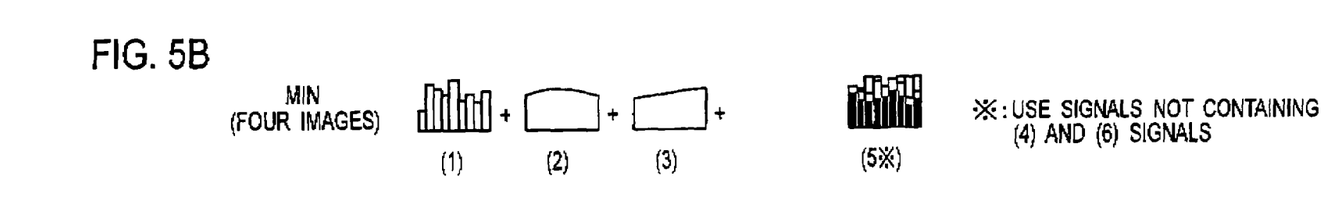
FIG. 5B is an explanatory diagram showing the smallest value of the noise component of each type which is evaluated from four images in FIG. 5A
Figure 5C:
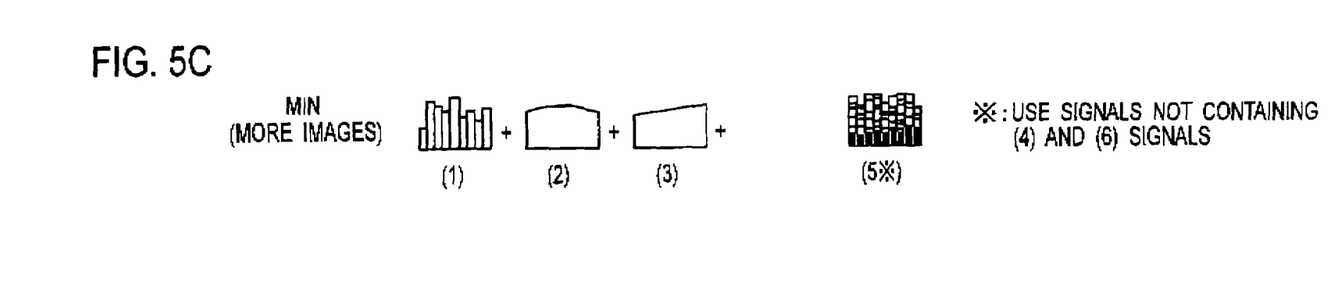
FIG. 5C is an explanatory diagram showing the smallest value of the noise component of each type which is evaluated from numerous images more than the four images in FIG. 5A.

It should be noted that there is a higher probability that the volume (represented by hatched portions in the histogram in each of FIGS. 5B and 5C) of the noise component of "(5) THERMAL NOISE PLUS READOUT NOISE COMPONENT" is smaller when, as shown in the schematic diagram of FIG. 5C, the smallest pixel value is selected from each group of corresponding pixels across equal to or greater than five images, than when, as shown in the schematic diagram of FIG. 5B, the smallest value is selected from each group of corresponding pixels across four images.

For this reason, if the amount of correction of "(5) THERMAL NOISE PLUS READOUT NOISE COMPONENT" is intended to be reduced to a minimum, it is desirable that the number of images across which the smallest pixel value is selected from each group of corresponding pixels be increased as many as possible. In this respect, it is desirable that the smallest pixel value be selected from each group of corresponding pixels across all the images to be used for the superposition process, which will be described later.

Subsequently, after the correction is made on the four types of the noise components mentioned above, "(4) NOISE COMPONENT ATTRIBUTED TO STAR" is subsequently eliminated by: superposing each two successive images representing the sky area photographed with the photographing apparatus for the moving object detection, by moving the two successive images by parallel displacement in accordance with the movement direction of the star and by the amount of movement of the star; and subtracting the pixel values at the same pixel positions overlapping each other across the two images. The correction to be made by removing the noise components in step S31 in FIG. 3 is hence completed.

Thereafter, using the superposition method, the superposition process step (step S5 in FIG. 1) performs a space debris candidate extraction process on each of the images successively photographed with the photographing apparatus (not illustrated) at constant intervals.

To put it concretely, using the pixel values at the same pixel positions overlapping one another, an evaluation value for the space debris detection is calculated while, by parallel displacement, sequentially moving each image by an estimated moving velocity of the space debris (i.e., a length (distance or interval) on the image at the estimated moving velocity within a predetermined time period). While changing the estimated moving velocity of the space debris, this evaluation value is calculated for each estimated moving velocity. Furthermore, the calculation of the evaluation value using the pixel values at the same pixel positions overlapping one another across the images is performed for each pixel position of each image.

As the evaluation value, for example, a median value, an average value or the like of all the images concerning the pixel values at target pixel positions can be used. For example, if the evaluation value is equal to or greater than a predetermined threshold value at a certain pixel, then the pixel can be judged as the pixel into which the space debris is captured.

In this embodiment, as described above, in the preliminary process step in step S3 of FIG. 1 executed by using the superposition method, the smallest pixel value among the pixel values at the same pixel positions of all the images is subtracted from each of the pixel values at the pixels in the images captured with the photographing apparatus (not illustrated).

Thereby, "(1) OFFSET COMPONENT OF CCD ELEMENT," "(2) GRADATION COMPONENT OF BACKGROUND LIGHT" and "(3) OFFSET COMPONENT OF OPTICAL SYSTEM", which appear constantly, can be eliminated from (the pixel values of) the image signals. Furthermore, since "(5) THERMAL NOISE PLUS READOUT NOISE COMPONENT" included in the smallest pixel value is a minimum volume which is infinitely close to "0," this type of noise component can be kept from remaining in (the pixel values of) the corrected image signals as much as possible.

The performing of the preliminary step like this makes it possible to prevent "(5) THERMAL NOISE PLUS READOUT NOISE COMPONENT", to be included in the correction values, from remaining in (the pixel values of) the corrected image signals as in the case where "(1) OFFSET COMPONENT OF CCD ELEMENT," "(2) GRADATION COMPONENT OF BACKGROUND LIGHT" and "(3) OFFSET COMPONENT OF OPTICAL SYSTEM" in each image are corrected by use of the individually obtained correction values.

Accordingly, the offset correction is performed in a way that the smallest pixel value among the pixel values at the same pixel positions across all the images is subtracted from the pixel values at the pixels in the images. Thus, when the space debris is detected by the superposition method it is possible to further reduce the noise components in the images to be superposed, thereby detecting the candidates for the pixels into which the space debris is captured, and eventually detecting the space debris accurately.

The embodiment has been described citing the superposition method to be performed on the observation object which is the moving object in uniform linear motion on the images in the estimated movement direction and with the estimated movement amount. Nevertheless, the present invention is also applicable to a superposition method to be performed on an observation object which is a moving object in uniform acceleration motion on images with an estimated movement amount which increases or decreases by a constant amount over time.

Furthermore, the technique of removing the noise component attributed to the star, which has been explained as a part of the correction to be made by removing the noise components in step S31 of FIG. 3 can be applied to a moving object other than the space debris, a non-star moving object which is not the detection object, and can be used as a technique of removing a noise component in captured images into which the moving object is captured. However, since each two successive captured images are superposed in accordance with the relative movement, the contents of the movement of the moving object during each photographing interval (for example, the direction and amount of movement of the moving object in a case where the moving object is in uniform linear motion) need to be known in advance.

Furthermore, the foregoing descriptions have been provided for the embodiment in which the superposition method is used to detect the moving object. Nevertheless, the present invention is also applicable to detection of a moving object using block-matching tracking or optical flow tracking, instead of the superposition method. Moreover, the present invention is also applicable to detection of a moving object using a process in which: a movement model is hypothesized for a moving object; not only its uniform linear motion but also its movement direction are estimated using a particle filter or the like; and a highly probable body is extracted as a moving object.

Furthermore, the foregoing descriptions have been provided for the embodiment in which the present invention is carried out as the space debris detection method. Nevertheless, the present invention is broadly applicable to the detection of a moving object other than the space debris from images captured in constant intervals using, for example, the identification and detection of an object other than the space debris, such as an artificial satellite orbiting the earth, or colored microbes, on captured images.

In the embodiment, the captured images include: the noise component attributed to the characteristic variation unique to the apparatus for quantizing the captured images into the image signals; the noise component attributed to the environmental conditions in which the photographic object exists; and the noise component which occurs in the course of quantizing the captured images into the image signals.

The first two noise components constantly appear in the same contents as long as the apparatus continues to be used or the environment in which the photographing is carried out remains unchanged. These noise components can be eliminated when (the pixel values of) the image signals are corrected using the correction contents determined based on the contents of the noise components which are respectively evaluated using the image signals obtained when the images are photographed under appropriate conditions.

On the other hand, the noise component occurring when the captured images are quantized into the image signals is the random noise which does not depend on time, environment or the like, but varies on a random basis. Furthermore, the noise component is included not only in the image signals to be corrected, but also in the image signals to be used to determine the correction contents. For this reason, when (the pixel values of) the image signals to be corrected are corrected using the separately-determined correction contents, the noise component occurring during the quantization is added onto and included in the corrected image signals.

By contrast, together with the constantly-appearing noise component attributed to the characteristic variation unique to the apparatus and the constantly-appearing noise component attributed to the environment in which the photographing is carried out, the noise component occurring in the course of quantizing the captured images into the image signals, which is the random noise, is included in the smallest pixel value in each group of corresponding pixels across all the images, which is used to perform the offset correction on the pixel values in the images. In this regard, the random noise included in each group of corresponding pixels across all the images is smaller in volume than any other noise components.

For this reason, when the offset correction is performed on the pixel values of the images using the smallest pixel value in each group of corresponding pixels across all the images, the constantly-appearing noise component attributed to the characteristic variation unique to the apparatus, and the constantly-appearing noise component of the type attributed to the environment in which the photographing is carried out are eliminated. Further, the noise component of the type occurring in the course of quantizing the captured images into the signal images, which is the random noise, is reduced to the smallest volume.

Thereby, it is possible to prevent the noise component occurring in the course of quantizing the captured images into the image signals from being added onto and included in (the pixel values of) the corrected image signals, as in the case of individually correcting the noise components respectively depending on the corresponding correction values. In addition, when the detection object in the images is detected based on the signal levels, it is possible to reduce the noise components existing in the background area behind the detection object in each image.

In the embodiment, if a moving object different from the moving object being the observation object, is captured in the images, and if the movement contents of the different moving object during constant intervals are known in advance, the pixel values at the same pixel positions across the successive images in equal intervals, moved by contents corresponding to the movement contents of the different moving object, are subtracted from the offset-corrected images. Thereby, when the detection object in the images is detected based on the signal levels, the noise components existing in the background area behind the detection object in each image can be reduced further.

In sum, even if a star, cosmic rays or the like are captured into the images at higher luminance together with an object orbiting the earth being a moving object being an observation object, the embodiment can further reduce from each image noise components that exist in the background area behind the object orbiting the earth in each image.

What is claimed is:

1. A method of detecting a moving object being an observation object using a plurality of images captured in equal intervals, comprising:
   detecting the moving object being the observation object by using a plurality of offset-corrected images obtained from the plurality of images by performing offset correction on pixel values of pixels across all the images using the smallest pixel value among the pixels across all the images.

2. The method according to claim 1, wherein the offset correction is performed on the pixel values by use of the smallest pixel value among the pixel values of the pixels across the plurality of images captured with a photographic area fixed.

3. The method according to claim 1, wherein
   the offset-corrected images are sequentially moved in accordance with contents corresponding to estimated movement contents of the moving object being the observation object in the equal intervals, and
   the moving object being the observation object is detected from the plurality of offset-corrected images based on the pixel values at the same pixel positions across the offset-corrected images.

4. The method according to claim 2, wherein
   the offset-corrected images are sequentially moved in accordance with contents corresponding to estimated movement contents of the moving object being the observation object in the equal intervals, and the moving object being the observation object is detected from the plurality of offset-corrected images based on the pixel values at the same pixel positions across the offset-corrected images.

5. The method according to claim 1, comprising:
performing a filtering process on each pixel in one image of the plurality of offset-corrected images and calculating a pixel value of the filtered pixel, the filtering process configured to move the one image and a different offset-corrected image, which is photographed one interval before or after the one image in the equal intervals in accordance with contents corresponding to already-known movement contents in the equal intervals of a moving object different from the observation object, and to subtract pixel values at the pixels in the different image from the pixel values at the pixels in the one image, the pixels in the different image overlapping and being located at the same pixel positions as the corresponding pixels in the one image, and
using the calculated pixel values after the filtering process as the pixel values in the one offset-corrected image.

6. The method according to claim 2, comprising:
performing a filtering process on each pixel in one image of the plurality of offset-corrected images and calculating a pixel value of the filtered pixel, the filtering process configured to move the one image and a different offset-corrected image, which is photographed one interval before or after the one image in the equal intervals in accordance with contents corresponding to already-known movement contents in the equal intervals of a moving object different from the observation object, and to subtract pixel values at the pixels in the different image from the pixel values at the pixels in the one image, the pixels in the different image overlapping and being located at the same pixel positions as the corresponding pixels in the one image, and
using the calculated pixel values after the filtering process as the pixel values in the one offset-corrected image.

7. The method according to claim 3, comprising:
performing a filtering process on each pixel in one image of the plurality of offset-corrected images and calculating a pixel value of the filtered pixel, the filtering process configured to move the one image and a different offset-corrected image, which is photographed one interval before or after the one image in the equal intervals in accordance with contents corresponding to already-known movement contents in the equal intervals of a moving object different from the observation object, and to subtract pixel values at the pixels in the different image from the pixel values at the pixels in the one image, the pixels in the different image overlapping and being located at the same pixel positions as the corresponding pixels in the one image, and
using the calculated pixel values after the filtering process as the pixel values in the one offset-corrected image.

8. The method according to claim 4, comprising:
performing a filtering process on each pixel in one image of the plurality of offset-corrected images and calculating a pixel value of the filtered pixel, the filtering process configured to move the one image and a different offset-corrected image, which is photographed one interval before or after the one image in the equal intervals in accordance with contents corresponding to already-known movement contents in the equal intervals of a moving object different from the observation object, and to subtract pixel values at the pixels in the different image from the pixel values at the pixels in the one image, the pixels in the different image overlapping and being located at the same pixel positions as the corresponding pixels in the one image, and
using the calculated pixel values after the filtering process as the pixel values in the one offset-corrected image.

9. The method according to claim 1, wherein
the moving object being the observation object is an object orbiting the Earth, and
the images are images which are photographed at intervals during fixed-point observation.

10. The method according to claim 2, wherein
the moving object being the observation object is an object orbiting the Earth, and
the images are images which are photographed at intervals during fixed-point observation.

11. The method according to claim 3, wherein
the moving object being the observation object is an object orbiting the Earth, and
the images are images which are photographed at intervals during fixed-point observation.

12. The method according to claim 4, wherein
the moving object being the observation object is an object orbiting the Earth, and
the images are images which are photographed at intervals during fixed-point observation.

13. The method according to claim 5, wherein
the moving object being the observation object is an object orbiting the Earth, and
the images are images which are photographed at intervals during fixed-point observation.

14. The method according to claim 6, wherein
the moving object being the observation object is an object orbiting the Earth, and
the images are images which are photographed at intervals during fixed-point observation.

15. The method according to claim 7, wherein
the moving object being the observation object is an object orbiting the Earth, and
the images are images which are photographed at intervals during fixed-point observation.

16. The method according to claim 8, wherein
the moving object being the observation object is an object orbiting the Earth, and
the images are images which are photographed at intervals during fixed-point observation.

* * * * *